United States Patent Office 3,773,855
Patented Nov. 20, 1973

3,773,855
MODIFIED POLYOLEFIN COMPOSITIONS HAVING
CONTROLLED MELT FLOW
Albert Schrage, East Orange, and Philip D. Readio,
Sparta, N.J., assignors to Dart Industries Inc., Los
Angeles, Calif.
No Drawing. Original application Mar. 30, 1971, Ser. No.
129,629, now Patent No. 3,699,186. Divided and this
application May 11, 1972, Ser. No. 252,380
Int. Cl. C08f 35/02, 29/02
U.S. Cl. 260—827   8 Claims

ABSTRACT OF THE DISCLOSURE

In modified polyolefin compositions prepared by reacting an olefin polymer with a polymerizable compound generally defined by (I)

(II)

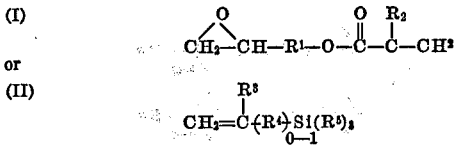

in the presence of an organic peroxide the met flow may be controlled by including in the reactants a modifier comprising acrylic or methacrylic esters of diols or triols. The reaction product is particularly suitable for being reinforced with filamentary material such as glass fibers or asbestos or as a coating on metallic surfaces.

---

This is a division of application Ser. No. 129,629 filed Mar. 30, 1971, now U.S. Pat. No. 3,699,186.

This invention relates to improvements in modified polyolefin compositions having good adhesiveness characteristics.

Modified polyolefin compositions having good adhesiveness characteristics, particularly toward polar materials, are described in copending application Ser. No. 81,526, filed Oct. 16, 1970, now U.S. Pat. No. 3,699,186. These compositions are formed, in general, by reacting an olefin polymer with certain ethylenically unsaturated polymerizable compounds in the presence of an organic peroxide. While the resulting modified polyolefin compositions exhibit adhesiveness characteristics which are far superior to the unmodified polyolefins the melt flow of the compositions is undesirably high. As is well known, polymers having undesirably high melt flow values also undergo a decrease in physical properties such as tensile strength, flexural strength and impact strength.

This invention provides a solution to the problems of unduly high melt flow in these modified polyolefin compositions. Briefly, the invention involves the use of certain acrylic esters of diols and triols as modifiers in the reaction of the olefin polymer with the ethylenically unsaturated polymerizable compound in the presence of the organic peroxide. These esters are merely charged along with the other reactants to a reactor and the entire mixture is subjected to the usual polymerization conditions. The resulting modified polyolefin compositions have far lower melt flow values than such compositions prepared without the use of the modifiers.

The improved modified polyolefin compositions to which this invention relates are those derived by reacting an olefin polymer, 0.01% to 10% by weight based on the olefin polymer of a polymerizable compound defined by

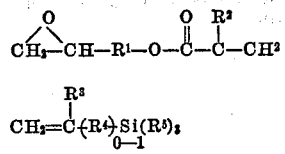

or

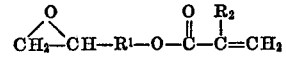

wherein $R^1$, $R^2$, $R^3$, $R^4$, and $R^5$ are hereinafter defined, and 0.01% to 10% by weight based on the olefin polymer of a modifier comprising acrylic esters of diols or triols in the presence of an organic peroxide.

The olefin polymer is one which is derived from alpha-olefin monomers having 2 to 10 carbon atoms. Included among these are polyethylene, polypropylene, poly-(butene-1), poly(4-methyl-pentene-1), ethylene-propylene random and block copolymers and terpolymers of ethylene-propylene-butene-1 as well as many others.

The polymerizable compounds include those defined by

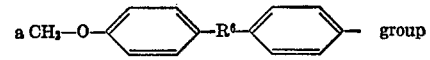

wherein $R^1$ is a cyclic, straight or branched chain alkylene group having 1 to 20 carbon atoms;

a CH₂—O—⟨⟩—R⁶—⟨⟩— group wherein $R^6$ is a straight or branched chain alkylene radical having 1 to 10 carbon atoms, oxygen, sulfur, amino,

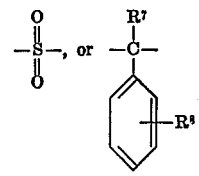

wherein $R^7$ is H or lower alkyl and $R^8$ is lower alkyl;

a $-\left[-R^9-X-R^9-\right]_p-$ group wherein each $R^9$ is a straight or branched chain lower alkylene, X is an amino group or an oxygen or sulfur atom, and $p$ is an integer of 1 to 20;

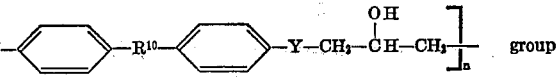
group wherein Y represents oxygen or sulfur atoms, $R^{10}$ is a straight or branched chain alkylene radical having 1 to 10 carbon atoms,

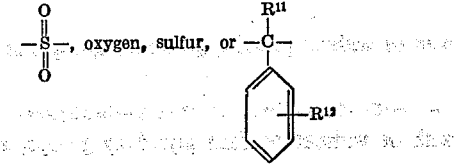

wherein $R^{11}$ is H or lower alkyl and $R^{12}$ is lower alkyl; and $n$ is an integer of 1 to 20;

a 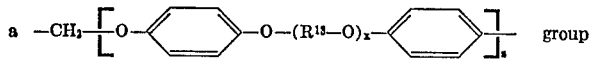 group wherein $R^{13}$ is lower alkyl, $x$ is an integer of 1 to 10 and $z$ is an integer of 1 to 10;

a 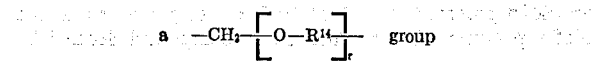 group wherein $R^{14}$ is lower alkyl and $r$ is an integer of 1 to 100;

a 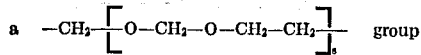 group wherein $s$ is an integer of 1 to 100;
and $R^2$ is H or $CH_3$. Preferably, $R^1$ is a $C_1$–$C_{18}$ alkylene group and $R^2$ is H or $CH_3$.

By way of specific example of some of the compounds included in this definition there may be mentioned glycidyl acrylate; glycidyl methacrylate; the acrylic and methacrylic esters of the monoglycidyl ether of sulfonyl bis-phenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of α,α-bis(p-hydroxyphenyl) tolylethane; the acrylic and methacrylic esters of 3-oxy-6,7-epoxyheptanol, 3-aza-6,7-epoxyheptanol, or 3-thia-6,7-epoxyheptanol; the reaction products of one mole of acrylic or methacrylic acid with one mole of polyphenylenesulfide diglycidyl ether, polyphenyleneamine diglycidyl ether, or polyphenyleneoxide diglycidyl ether; the reaction products of one mole of acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the polycondensation product of epichlorohydrin with α,α-bis(p-hydroxyphenyl) tolylethane or α,α-bis(p-thiophenyl) tolylethane; the acrylic and methacrylic esters of poly ($C_1$–$C_4$ alkylene-oxide glycol) monoglycidyl ether; and the acrylic and methacrylic esters of poly [(co-alkylene-phenylene-oxide) glycol] monoglycidyl ether. All of these compounds are disclosed in copending application Ser. No. 81,527 filed Oct. 16, 1970 now U.S. Pat. No. 3,701,751.

Also included within the polymerizable compounds are those compounds defined by

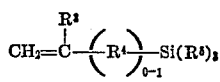

wherein $R^3$ is hydrogen or an alkyl radical having 1 to 4 carbon atoms;
$R^4$ is a straight, branched or cyclic alkylene radical having 1 to 10 carbon atoms with or without pendant glycidoxy groups; a substituted or unsubstituted phenylene group with or without pendant glycidoxy groups;

a —C—O— group
   ‖
   O a 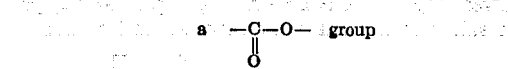 group with or without pendant glycidoxy groups;

a 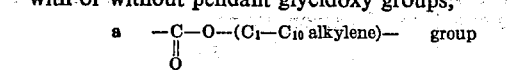 group with or without pendant glycidoxy groups; or a 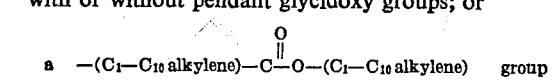 group with or without pendant glycidyl groups; and $R^5$ is halogen (bromine or chlorine in particular), an alkoxy radical having 1 to 10 carbon atoms, or an acyloxy radical having 1 to 10 carbon atoms.

Preferably, $R^4$ is absent or a $C_1$–$C_{10}$ alkylene group while $R^3$ and $R^5$ are as described above.

Included within the above defined group of compounds are the following by structure

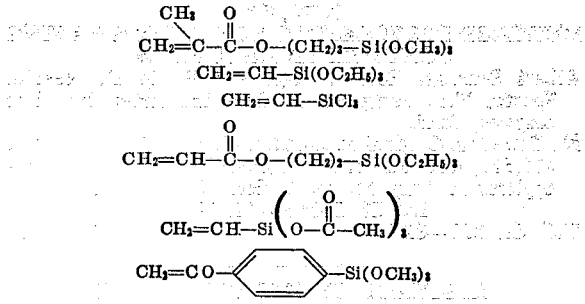

Such compounds are commercially available.

The acrylic esters of diols or triols which may be used as the modifier in the invention include those defined by the following formula

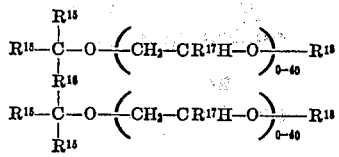

wherein each $R^{15}$ is H or $C_1$–$C_4$ alkyl;
$R^{16}$ is

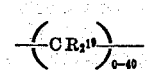

wherein $R^{19}$ is H or $C_1$–$C_4$ alkyl;

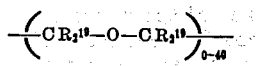

wherein $R^{19}$ is defined above;

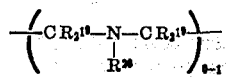

wherein $R^{19}$ is defined above and $R^{20}$ is H or

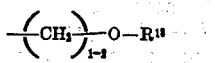

or

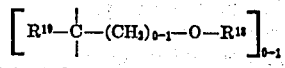

wherein $R^{19}$ is defined above;
$R^{17}$ for each unit is H or —$CH_3$;
and
$R^{18}$ is

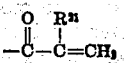

wherein $R^{21}$ is H or —$CH_3$.

The above acrylic esters are either commercially available or may be prepared by conventional direct esterification techniques involving reaction between acrylic acid or methacrylic acid and the particular diol or triol. Conventional acylation techniques may also be used wherein acryloyl chloride or methacryloyl chloride are substituted for the acids in reacting with the diols or triols. Any diol or triol coming within the scope of the corresponding portion of the above structural formula may be used for such preparation. For example, ethylene glycol, diethylene glycol, triethylene glycol, tetraethylene glycol, propylene glycol, dipropylene glycol, polypropylene glycols, hexylene glycol, 2-methyl-2-ethyl-1,3-propanediol, 2-ethyl-1,3-hexanediol, 1,5-pentanediol, glycerine, 1,2,6-hexanetriol, triethanol amine, diethanol amine, 1,4-butanediol, polyethylene glycol, 1,2,4-hexanetriol, trimethylol ethane, trimethylol propane, poly(oxypropylene)-poly(oxyethylene) glycols and alkylene triols, poly(oxypropylene-oxyethylene) glycols and alkylene triols, and the like.

The preferred acrylic esters are those defined by the formula

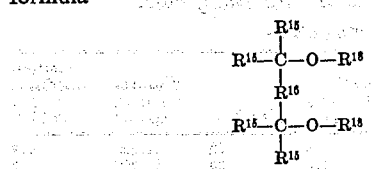

wherein
each $R^{15}$ is H or —$CH_3$;
$R^{16}$ is

or

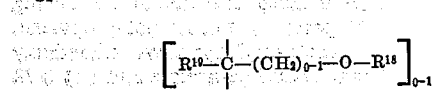

wherein $R^{19}$ is H or $C_1$–$C_4$ alkyl; and
$R^{18}$ is

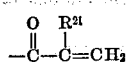

wherein $R^{21}$ is H or —$CH_3$.

As mentioned above the improved modified polyolefin compositions of this invention are derived by reacting the olefin polymer, the ethylenically unsaturated compound and the acrylic ester or mixture of acrylic esters in the presence of an organic peroxide. Normally, such organic peroxide is employed in an amount in the range of about 0.01% by 5% by weight based on the olefin polymer.

Suitable organic peroxides useful in this invention include both solid and liquid organic peroxides. In order to insure good distribution of the peroxide throughout the mixture of ingredients prior to reaction it is preferred to use a liquid form of the peroxide. Thus, for convenience, those organic peroxides which are normally liquid or which become liquid at or near the temperature at which the particular reaction is run are preferred over the solid-type organic peroxides. However, by dissolving the solid organic peroxide in a suitable organic solvent, that is one that has no substantial adverse effect on free radical polymerization reactions, a suitable physical form is obtained which can be used with substantially equal success in the process of the invention. Since the solvent, for this purpose, merely functions as a carrier for the solid organic peroxide it makes no difference whether or not it becomes vaporized prior to reaching reaction temperature since the peroxide at that point in the process has already been distributed throughout the ingredients.

Some examples of suitable peroxides include di-t-butyl peroxide, t-butyl hydroperoxide, methyl ethyl ketone peroxide, t-butyl perbenzoate, t-butyl peracetate, t-butyl peroxypivalate, acetyl peroxide, t-butyl peroctoate, t-butyl peroxyisobutyrate, decanoyl peroxide, lauroyl peroxide, benzoyl peroxide, 2,5-dimethylhexane-2,5-diperoxybenzoate, cyclohexanone peroxide, cumene hydroperoxide, p-methane hydroperoxide, di-t-butyl-diperoxyphthalate, cumyl peroxide, caproyl peroxide, and the like. Of course, there are additional organic peroxides in this group but are too numerous to attempt to individually name. In the event it is desirable to use a solvent some which would be suitable include benzene, mineral spirits, toluene, chlorobenzene, dichlorobenzene, acetone, dimethyl phthalate, t-butyl alcohol, anisole, decalin, xylene and others which possess the required inertness to the reaction. As mentioned previously, it is preferred that the organic peroxide be in a liquid form or capable of dissolution in a substantially inert organic solvent at or near the temperature at which the particular reaction is carried out.

It is pointed out that oxygen cannot be employed in the process even though it is sometimes regarded as a free radical initiator. Oxygen is known to cause deleterious effects on polymerizable monomers such as the ethylenically unsaturated compounds and acrylic esters used in this invention (see page 36 of the reprint of chapters I–IV from Monomeric Acrylic Esters by E. H. Riddle, 1954).

Selection of a particular organic peroxide or mixture of organic peroxides of the type mentioned above may be easily determined based on the temperature at which the particular reaction is to be carried out and the corresponding decomposition rate of the peroxides as evidenced by their respective half-lives. The half-lives of peroxides are well known and may be readily ascertained (see U.S. U.S. 3,293,233 and Encyclopedia of Chemical Technology, Kirk-Othmer, 2d edition, vol. 14, pp. 810–813).

The manner in which the materials are reacted is not critical. Thus, for example, it may be expeditious to merely admix the materials using any type of mixing device and, after charging the mixture to a reactor, heating the mixture to an optimum temperature whereat the organic peroxide decomposes to generate free radicals. The reaction may be conducted with all of the ingredients dissolved in inert solvents or while in a molten state. The olefin polymer may be molten or in solid particulate form while the remaining ingredients are in a liquid or dissolved state.

The temperature is also not critical for conducting the reaction except to the extent that it must not be so high as to cause degradation of the olefin polymer, the ethylenically unsaturated compound, or the acrylic esters. As mentioned above, the temperatures employed go hand-in-hand with the particular peroxide selected. For example, if it is desired to conduct the reaction at a low temperature one would most likely select a peroxide having a low temperature 10-hr. half-life, e.g. acetyl peroxide for use at about room temperature.

The pressure at which the reaction is conducted is not critical and, in general, good results can be obtained at pressures in the range of atmospheric up to about 1000 p.s.i. For practical reasons it is convenient to operate at pressures of atmospheric up to about 200 p.s.i.

Since oxygen has some adverse effect on the reaction it is desirable to conduct the reaction in a substantially oxygen-free atmosphere if possible. While small amounts of oxygen can probably be tolerated in the system effort should be made to prevent introduction of additional oxygen over and above what may be initially present. Preferably, the reactor is purged with an inert gas prior to conducting the reaction.

In conducting the reaction using a solid form of polyolefin it is desirable to substantially completely decompose the organic peroxide before recovering the product as the presence of any residual peroxide, even in small quantities, may adversely affect the resulting composition in subsequent compounding, molding or extruding operations. Of course, if one can tolerate certain of the adverse effects then the extent of decomposition of the peroxide may be somewhat incomplete.

The reaction product, that is the resulting composition, of this invention is particularly suited for reinforcement with filamentary material such as glass fibers or asbestos. Such reinforced compositions may be produced in accordance with conventional techniques, see U.S. 3,416,990, U.S. 3,453,356 and U.S. 3,042,570. In addition, the reaction product is useful in coating metallic surfaces, e.g. cans and the like, due to the adhesiveness properties it possesses.

Other additives may be incorporated in the reaction product including fillers, pigments, stabilizers, antioxidants, slip agents, anti-static agents, mold release agents, flame retardants and the like.

The following examples will serve to further illustrate the invention.

EXAMPLE 1

A mixture comprising 100 parts by weight polypropylene particles (average size in the range of 0.01 mm. to 4 mm.), 0.5 part by weight glycidyl acrylate, 0.5 part by weight t-butyl peracetate (75% solution in benzene) and 1.55 parts by weight ethylene glycol dimethacrylate were mixed in a Waring blender and charged to a reactor with a paddle stirrer. The dry-appearing mixture was stirred to distribute the materials while first purging the system with argon and then heating to about 125° C. under autogenous pressure. The mixture was maintained at about 125° C. for about 4 hours while continuing the stirring and then cooled and subjected to vacuum to remove any volatiles present. The resulting composition was recovered directly from the reactor in a particulate form.

Using the same procedure outlined in the previous paragraph a second composition was prepared except that 1.76 parts by weight 1,3-butylene dimethacrylate were substituted for the ethylene glycol dimethacrylate. The product again was recovered in a particulate form.

For comparison, a third composition was prepared using the same procedure except that no ethylene glycol dimethacrylate or 1,3-butylene dimethacrylate was employed. The product composition was recovered in a particulate form.

Each of the above compositions was tested for melt flow (230° C.) in accordance with ASTM D-1238 and then blended with 20 weight percent chopped glass fibers (¼ inch, OCF 885) for testing for flexural strength and flexural modulus properties in accordance with ASTM D-790-66. The results of these evaluations are indicated in the following table.

TABLE 1 [a]

| Sample No. | EGDM [b] (parts by weight) | BDM [c] (parts by weight) | Melt flow | Flexural strength (p.s.i.) | Flexural modulus (p.s.i.) ($\times 10^{-5}$) |
|---|---|---|---|---|---|
| 1 | 1.55 | | 36 | 15,400 | 4.5 |
| 2 | | 1.76 | 28 | 14,900 | 4.9 |
| 3 | | 1.76 | 38 | 14,900 | 4.6 |
| 4 | | | 55+ | 15,300 | 4.8 |

[a] All samples prepared using 0.5 part by weight peroxide.
[b] Ethylene glycol dimethacrylate.
[c] 1,3-butylene dimethacrylate.

EXAMPLE 2

A similar series of compositions were prepared as in Example 1 for comparison except that the mixtures being reacted comprised 100 parts by weight polypropylene, 0.5 part by weight glycidyl acrylate, 0.25 part by weight t-butyl peracetate and (1) 0.78 part by weight ethylene glycol dimethacrylate, or (2) 1.55 part by weight ethylene glycol dimethacrylate, or (3) 0.5 part by weight trimethylol propane trimethacrylate, or (4) 1.0 part by weight trimethylol propane trimethacrylate, or (5) no additional ingredient. The compositions were tested as in Example 1 and the results are indicated in the following table.

TABLE 2 [a]

| Sample No. | EGDM [b] (parts by weight) | TMPTM [c] (parts by weight) | Melt flow | Flexural strength (p.s.i.) | Flexural modulus (p.s.i.) ($\times 10^{-5}$) |
|---|---|---|---|---|---|
| 1A | 0.78 | | 20 | 16,400 | 4.7 |
| 1B | 0.78 | | 18 | 15,800 | 4.7 |
| 2 | 1.55 | | 13 | 15,200 | 4.4 |
| 3A | | 0.5 | 15 | 15,700 | 5.4 |
| 3B | | 0.5 | 19 | 16,300 | 5.6 |
| 4A | | 1.0 | 4 | 14,500 | 5.1 |
| 4B | | 1.0 | 10 | 14,600 | 5.0 |
| 5A | | | 38 | 12,000 | 3.8 |
| 5B | | | 38 | 14,300 | 4.6 |

[a] All samples prepared using 0.25 part by weight peroxide.
[b] Ethylene glycol dimethacrylate.
[c] Trimethylol propane trimethacrylate.

EXAMPLE 3

Another series of compositions were prepared as in Example 1 for comparison except that the mixtures being reacted comprised 100 parts by weight polypropylene, 1.0 part by weight glycidyl acrylate, 0.5 part by weight t-butyl peracetate and (1) 1.0 part by weight trimethylol propane trimethacrylate, or (2) no additional ingredient. The compositions were tested as in Example 1 and the results are indicated in the following table.

TABLE 3 [a]

| Sample No. | TMPTM [b] (parts by weight) | Melt flow | Flexural strength (p.s.i.) | Flexural modulus (p.s.i.) ($\times 10^{-5}$) |
|---|---|---|---|---|
| 1A | 1.0 | 22 | 14,300 | 4.7 |
| 1B | 1.0 | 24 | 15,200 | 5.1 |
| 2A | | 62 | 14,600 | 4.3 |
| 2B | | 54 | 15,100 | 4.4 |
| 2C | | 48 | 14,100 | 4.5 |

[a] All samples prepared using 0.5 part by weight peroxide.
[b] Trimethylol/trimethacrylate.

EXAMPLE 4

Another series of compositions were prepared as in Example 1 for comparison except that the mixtures being reacted comprised 100 parts by weight polypropylene, 0.2 part by weight γ-methacryloxypropyl trimethoxy silane, 0.5 part by weight t-butyl peracetate and (1) 0.78 part by weight ethylene glycol dimethacrylate, or (2) no additional ingredient. The compositions were tested as in Example 1 and the results are indicated in the following table.

TABLE 4 [a]

| Sample No. | EGDM [b] (parts by weight) | Melt flow | Flexural strength (p.s.i.) | Flexural modulus (p.s.i.) ($\times 10^{-5}$) |
|---|---|---|---|---|
| 1 | 0.78 | 30 | 14,900 | 4.8 |
| 2A | | 58 | 15,600 | 4.7 |
| 2B | | 55 | 14,200 | 4.5 |
| 2C | | 48 | 15,300 | 4.9 |

[a] All samples prepared using 0.5 part by weight peroxide.
[b] Ethylene glycol dimethacrylate.

EXAMPLE 5

A series of compositions were prepared as in Example 1 except that in each case the ingredients were charged to a 1 liter flask which was then partially immersed in a heated oil bath and continuously rotated. The oil bath was heated sufficiently to maintain the flask at a temperature of about 125° C. About ½ hour was allowed for warm-up of the flask and the reaction was then allowed to proceed for about four hours. Each composition was recovered in a particulate form. The compositions prepared comprised 100 parts by weight polypropylene, 0.25 part by weight glycidyl acrylate, 0.10 part by weight t-butyl peracetate and (1) 0.125 part by weight ethylene glycol dimethacrylate, or (2) 0.25 part by weight ethylene glycol dimethacrylate, or (3) 0.5 part by weight ethylene glycol dimethacrylate, or (4) no additional ingredient. The compositions were tested as in Example 1 and the results are indicated in the following table.

TABLE 5 [a]

| Sample No. | EGDM [b] (parts by weight) | Melt flow | Flexural strength (p.s.i.) | Flexural modulus (p.s.i.) ($\times 10^{-5}$) |
|---|---|---|---|---|
| 1 | 0.125 | 39 | 16,900 | 5.0 |
| 2 | 0.25 | 39 | 16,700 | 5.1 |
| 3 | 0.5 | 26 | 14,400 | 4.7 |
| 4 | | 59 | 15,600 | 4.6 |

[a] All samples prepared using 0.1 part by weight peroxide.
[b] Ethylene glycol dimethacrylate.

EXAMPLE 6

Using the same procedure as in Example 5 a series of compositions were prepared comprising 100 parts by weight polypropylene, 0.2 part by weight γ-methacryloxypropyl trimethoxy silane, 0.25 part by weight of 5-butyl peracetate and (1) 0.2 part by weight ethylene glycol dimethacrylate, or (2) no additional ingredient. The compositions were tested as in Example 1 and the results are indicated in the following table.

TABLE 6 [a]

| Sample No. | EGDM [b] (parts by weight) | Melt flow | Flexural strength (p.s.i.) | Flexural modulus (p.s.i.) (×10⁻⁵) |
|---|---|---|---|---|
| 1 | 0.2 | 20 | 16,700 | 5.16 |
| 2A | | 41 | 15,900 | 5.09 |
| 2B | | 41 | 16,400 | 5.16 |

[a] All samples prepared using 0.25 part by weight peroxide.
[b] Ethylene glycol dimethacrylate.

From the data of Tables 1-6 it is theorized that the quantity of peroxide used in the reaction may have an effect on the melt flow of the compositions, the greater the quantity of peroxide the higher the melt flow. However, in each table it is also apparent that in a series of specific reactions employing a specific quantity of peroxide the use of the modifiers results in compositions of reduced melt flow and generally better physical properties.

Thus having described the invention in detail it will be understood by those skilled in the art that certain variations and modifications may be made without departing from the spirit and scope of the invention as described herein or in the appended claims.

We claim:
1. A reaction product of
   (A) at least one olefin polymer derived from alpha-olefin monomers having 2 to 10 carbon atoms,
   (B) from 0.01% to 10% by weight of the olefin polymer of at least one polymerizable compound defined by

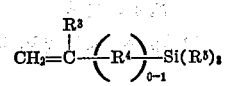

wherein
   $R^3$ is hydrogen or an alkyl radical having 1 to 4 carbon atoms;
   $R^4$ is a straight, branched or cyclic alkylene radical having 1 to 10 carbon atoms with or without pendant glycidoxy groups; a phenylene group with or without pendant glycidoxy groups;

a —C—O— group
       ‖
       O a —(C₁–C₁₀ alkylene)—C—O— group
                          ‖
                          O with or without pendant glycidoxy groups;

a —C—O—(C₁–C₁₀ alkylene)— group
       ‖
       O with or without pendant glycidoxy groups; or a —(C₁–C₁₀ alkylene)—C—O—(C₁–C₁₀ alkylene)— group
                          ‖
                          O with or without pendant glycidoxy groups; and
   $R^5$ is halogen, an alkoxy radical having 1 to 10 carbon atoms or an acyloxy radical having 1 to 10 carbon atoms, and
   (C) from 0.01% to 10% by weight based on the olefin polymer of at least one modifier defined by the formula

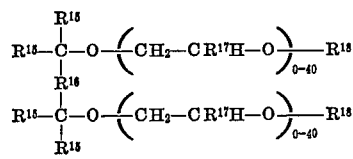

wherein
   each $R^{15}$ is H or $C_1$–$C_4$ alkyl; $R^{16}$ is

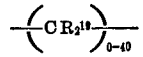

wherein $R^{19}$ is H or $C_1$–$C_4$ alkyl;

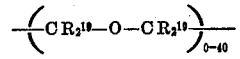

wherein $R^{19}$ is defined above;

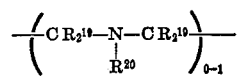

wherein $R^{19}$ is defined above $R^{20}$ is H or

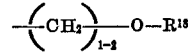

or

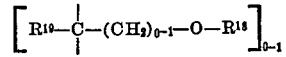

wherein $R^{19}$ is defined above;
   $R^{17}$ for each unit is H or —CH₃; and

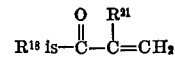

wherein $R^{21}$ is H or —CH₃,
   in the presence of an organic peroxide.

2. A reaction product according to claim 1 wherein the olefin polymer is polypropylene, polyethylene, or a copolymer of ethylene and propylene.

3. The reaction product according to claim 1 wherein the polymerizable compound is defined by one of the following structures.

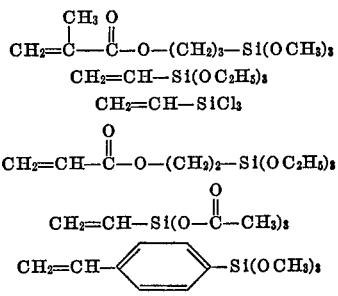

4. The reaction according to claim 1 wherein the polymerizable compound is γ-methacryloxypropyl trimethoxy silane; and the modifier is ethylene glycol diacrylate, ethylene glycol dimethacrylate, trimethylol triacrylate, trimethylol trimethacrylate, 1,3-butylene diacrylate, or 1,3-butylene dimethacrylate.

5. The reaction product according to claim 1 containing 5% to 90% by weight reinforcing filamentary material.

6. A metallic article coated with the reaction product of claim 1.

7. In a process for producing a polymer composition wherein an olefin polymer derived from alpha-olefin monomers having 2 to 10 carbon atoms and 0.01% to 10% by weight based on the olefin polymer of a polymerizable compound defined by the formula

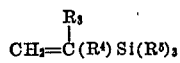

wherein
   $R^3$ is hydrogen or an alkyl radical having 1 to 4 carbon atoms;
   $R^4$ is a straight, branched or cyclic alkylene radical having 1 to 10 carbon atoms with or without pendant glycidoxy groups; a phenylene group with or without pendant glycidoxy groups;

a 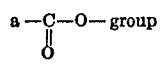 group a 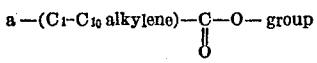 group with or without pendant glycidoxy groups;

a 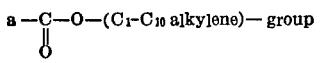 group with or without pendant glycidoxy groups; or a 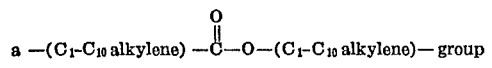 group with or without pendant glycidoxy groups; and $R^5$ is halogen, an alkoxy radical having 1 to 10 carbon atoms, or an acyloxy radical having 1 to 10 carbon atoms are reacted in the presence of an organic peroxide, the improvement therein of reducing the melt flow of the polymer composition by including with the ingredients being reacted 0.01% to 10% by weight based on the olefin polymer of a modifier defined by the formula

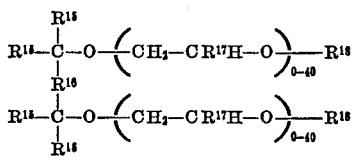

wherein
each $R^{15}$ is H or $C_1$-$C_4$ alkyl;
$R^{16}$ is

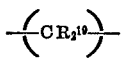

wherein $R^{19}$ is H or $C_1$-$C_4$ alkyl;

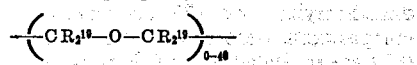

wherein $R^{19}$ is defined above;

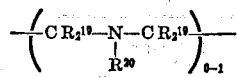

wherein $R^{19}$ is defined above and $R^{20}$ is H or

or

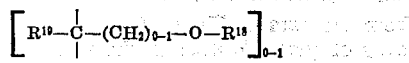

wherein $R^{19}$ is defined above;
$R^{17}$ for each unit is H or —$CH_3$;
and $R^{18}$ is

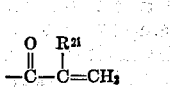

wherein $R^{21}$ is H or —$CH_3$.

8. A process according to claim 7 wherein the reaction is conducted in the absence of oxygen.

References Cited
UNITED STATES PATENTS

| | | | |
|---|---|---|---|
| 3,075,948 | 1/1963 | Santelli | 260—827 |
| 3,644,141 | 2/1972 | Preston | 260—827 |
| 3,505,279 | 4/1970 | Preston et al. | 260—827 |
| 3,573,334 | 3/1971 | Wheeler | 260—827 |

WILBERT J. BRIGGS, Sr., Primary Examiner

U.S. Cl. X.R.

117—132 BS; 260—37 SB, 41 AG, 836 R, 878 B

PO-1050
(5/69)

UNITED STATES PATENT OFFICE
CERTIFICATE OF CORRECTION

Patent No. 3,773,855     Dated November 20, 1973

Inventor(s) Albert Schrage and Philip D. Readio

It is certified that error appears in the above-identified patent and that said Letters Patent are hereby corrected as shown below:

Column 1, line 41, "now U.S. Patent No. 3,699,186"

Should read, "now U.S. Patent No. 3,696,169"

Signed and sealed this 9th day of April 1974.

(SEAL)
Attest:

EDWARD M. FLETCHER, JR.
Attesting Officer

C. MARSHALL DANN
Commissioner of Patents

PO-1050
(5/69)

UNITED STATES PATENT OFFICE
CERTIFICATE OF CORRECTION

Patent No. 3,773,855          Dated November 20, 1973

Inventor(s) Albert Schrage and Philip Readio

It is certified that error appears in the above-identified patent and that said Letters Patent are hereby corrected as shown below:

Column, line 41, "now U.S. Patent No. 3,699,186" should read, --now U.S. Patent No. 3,696,169--
(This correction has already been changed and certfied as of April 9, 1974)

NEW CORRECTIONS:

Column 4, line 5, "desicribed" should read --described--

Column 4, line 19, that portion of the formula reading:

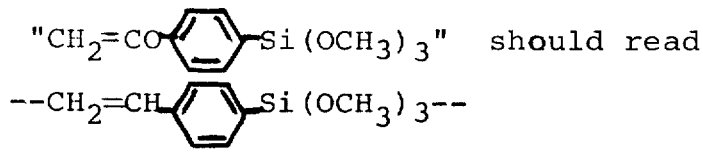

Column 8, line 20, "Trimethylol/trimethacrylate" should read --Trimethylol propane Trimethacrylate--

Signed and sealed this 17th day of September 1974.

(SEAL)
Attest:

McCOY M. GIBSON JR.          C. MARSHALL DANN
Attesting Officer            Commissioner of Patents